TELEVISION RECEIVER TO PRODUCE A SEQUENTIALLY DISPLAYED PICTURE FROM A CONVENTIONAL INTERLACED VIDEO SIGNAL

Filed Aug. 15, 1966 2 Sheets-Sheet 1

INVENTOR
J. B. O'NEAL, JR.
BY John K. Mullarney
ATTORNEY 3,499,982

TELEVISION RECEIVER TO PRODUCE A SEQUENTIALLY DISPLAYED PICTURE FROM A CONVENTIONAL INTERLACED VIDEO SIGNAL

John B. O'Neal, Jr., Matawan, N.J., assignor to Bell Telephone Laboratories, Incorporated, Murray Hill and Berkeley Heights, N.J., a corporation of New York Filed Aug. 15, 1966, Ser. No. 572,294
Int. Cl. H04n 3/16, 5/44
U.S. Cl. 178—7.5 3 Claims

ABSTRACT OF THE DISCLOSURE

A television signal receiver system reproduces a sequential picture display from a transmitted interlaced television signal. The various fields of the interlaced signal are delayed by a delay medium and repeatedly applied to an assigned electron gun until the field has completely traversed the delay medium. The extent of the delay medium is sufficient to allow each field to be repeatedly displayed for a number of times equal to the number of fields in each frame. Hence the fields of each frame are displayed simultaneously with each other resulting in a sequential picture display.

This invention relates to television and, more particularly, to improved techniques for displaying interlaced television signals.

In a two-way closed circuit television system provided for visual accompaniment to telephone service, regular or slightly modified telephone switching and transmission facilities are used to transmit the television signal. The bandwidth capacity of the telephone switching and transmission facilities is significantly smaller than the bandwidth involved with standard broadcast television systems. Now in order to reduce the bandwidth of the television signal, which supplies the visual accompaniment to telephone service the number of lines scanned in each frame are reduced as compared with broadcast television standards. As a result of the reduction in the number of lines scanned and the fact that the telephone user views the picture from a short distance, the line structure of the television signal may be apparent to the viewer. To further reduce bandwidth requirements and eliminate flicker these television signals are preferably "interlaced." However, with the aforementioned reduction in the number of lines scanned, the successive scanning of the lines of each field of the interlaced signal becomes apparent to the viewer. This phenomenon is called interline flicker and produces a visual impairment called line crawl. The interline flicker is particularly annoying when the viewer is close to the viewing screen as is the case in closed circuit television systems providing visual accompaniment to telephone communication.

It is, therefore, an object of the invention to eliminate interline flicker in the display of interlaced television signals.

It is another object of the invention to generate a sequential picture display from an interlaced television signal with minimal changes in the receiving system.

It is yet another object of the invention to increase the number of scan lines displayed during each field period of the television signal without increasing the transmission bandwidth requirements of the transmitted television signal.

Therefore, in accordance with the present invention, apparatus is provided in a television signal receiver for producing a sequential picture display from a received interlaced television signal. Each field of the received television signal is assigned to an individual electron gun in a multigun cathode ray tube at the receiver. Each individual electron gun scans only the lines of its assigned field. The received television signal is applied to a delay medium wherein it is delayed for a time interval equal to one frame period less one field period. The delay medium has a plurality of tap-off points equal to the number of fields in each frame of the television signal. The first tap-off point is at the entry to the delay medium and the balance of the tap-off points are spaced one field period apart along the medium. Switching apparatus simultaneously applies each field in the delay medium from its respective tap-off point to its assigned electron gun. By thus displaying all the fields simultaneously, a sequential display is generated from the received interlaced television signal.

It is apparent from the foregoing that by displaying all the fields simultaneously, the number of scanned lines displayed during each field period is increased to the extent of the total number of scanned lines in each frame. Hence the alternate scanning of the individual lines of each field of the television signal is no longer apparent as such to the viewer. This technique significantly improves the quality of the displayed picture by eliminating the interline flicker.

These and other objects and features, the nature of the present invention, and its various advantages will be more readily understood upon consideration of the attached drawings and of the following detailed description.

Figure 2A:
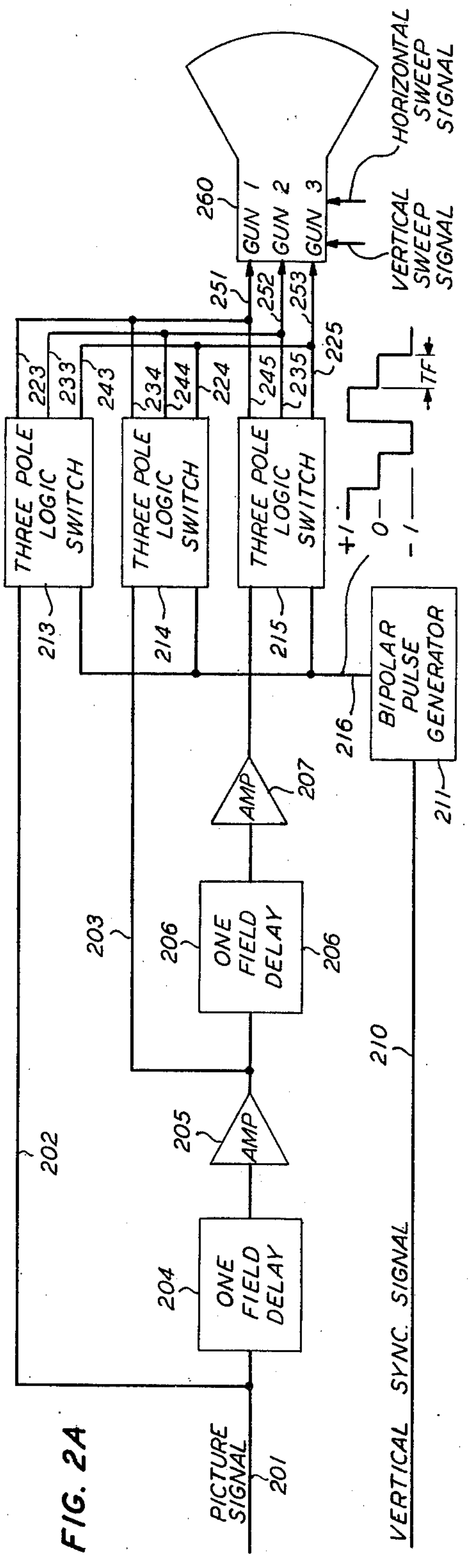
Figure 2B:
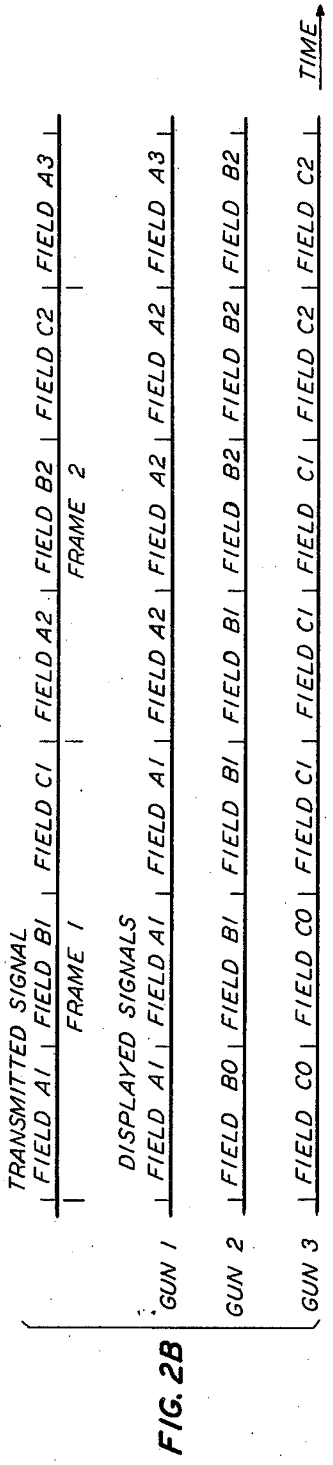

FIG. 2A is a schematic block diagram of another illustrative embodiment of the present invention to sequentially display a three-to-one interlaced television signal; and FIG. 2B is a diagrammatical representation of the time relations of the fields of a three-to-one interlaced television signal as transmitted and the fields of the signal as simultaneously displayed in accordance with the invention.

Figure 1A:
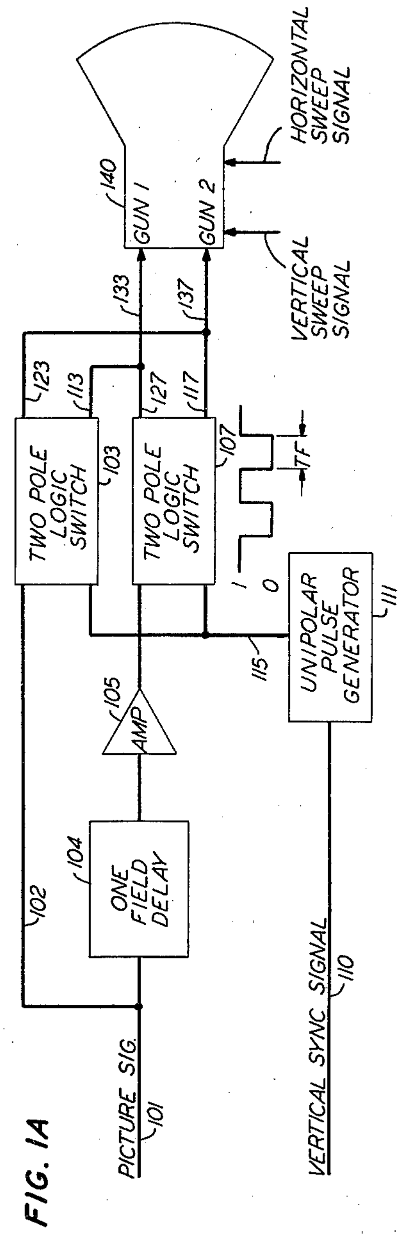
FIG. 1A is a schematic block diagram of one illustrative embodiment of the present invention to sequentially display a two-to-one interlaced television signal.

Referring now particularly to FIG. 1A, apparatus is shown for use in a television receiver to sequentially display a two-to-one interlaced television signal. To simplify the explanation of the invention, only the apparatus to combine the fields to produce a sequential display is shown. The equipment normally occurring in a television receiver is well known to those skilled in the art and need not be disclosed in detail.

The picture signal and the vertical synchronizing signal of the transmitted television signal are separated by conventional apparatus (not shown). The picture signal (known in the art as the video signal) is applied to lead 101 which is connected in parallel to a delay circuit 104, and, via lead 102, to a two-pole logic switch 103. The delay circuit 104 is also connected, via amplifier 105, to a two-pole logic switch 107. The separated vertical synchronizing signal is applied, via lead 110, to a unipolar pulse generator 111. The unipolar pulse generator 111, in response to the vertical synchronization signals, produces binary control signals which are alternatively representative of a binary "1" and a binary "0." These binary control signals, as shown in FIG. 1, have a duration of TF equaling a field period of the televesion signal.

The two-pole logic switches 103 and 107, in response to the binary control signals, applied via lead 115, each apply their respective incident fields of the picture signal, as described hereinbelow, to the proper ones of the two electron guns of the two gun cathode ray tube 140. The two gun cathode ray tube is of the type that utilizes a single vertical and horizontal sweep signal to concurrently control both electron guns. The two-pole logic switches 103 and 107 may comprise any switching network capable of selectively directing a signal to one of two outputs in response to a binary control signal. The design of such switches is believed to be readily apparent to those skilled in the art and it is not believed necessary to disclose such a switch in detail.

The picture signal applied to the delay circuit 104 is delay for a predetermined time period equivalent to one field period. The amplifier 105 compensates for the attenuation of the picture signal caused by traversing the delay circuit 104. For illustrative purposes the delay imposed on the signal by the amplifier is assumed to be negligible. However, it will be apparent to those in the art that this delay must be taken into account in determining the exact time delay of the delay circuit 104 to be applied to the picture signal. A delay circuit suitable for the above application is disclosed in A. H. Meitzler Patent 3,041,556, issued June 26, 1962.

The control signals generated by the unipolar pulse generator 111 are applied via lead 115, to the two-pole logic switches 103 and 107. Each of the two-pole logic switches 103 and 107, in response to a control signal representative of a binary "1," respectively transmit the applied picture signals to the output leads 113 and 117. In response to control signals representative of a binary "0," the two-pole logic switches 103 and 107, respectively, transmit their picture signals to the output leads 123 and 127. The output leads 113 and 127 are connected, via lead 133, to the first electron gun of the two gun cathode ray tube 140. The output leads 123 and 117 are connected, via lead 137, to the second electron gun of the two gun cathode ray tube 140. The first electron gun scans the odd fields of the television signal and the second electron gun scans the even fields. Two gun cathode ray tubes suitable for the above purposes are well known in the art and it is not believed necessary to discuss the same in detail.

Figure 1B:
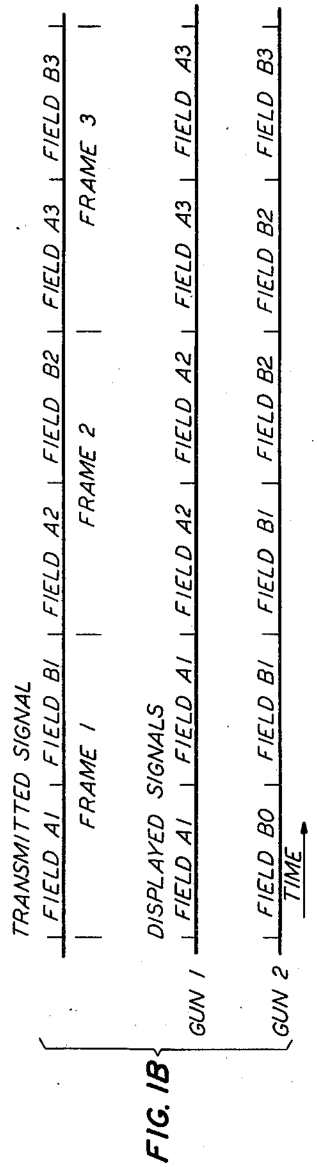
FIG. 1B is a diagrammatical representation of the time relations of the fields of a two-to-one interlaced television signal as transmitted and the fields of the signal as simultaneously displayed in accordance with the invention.

The manner in which a sequential display is produced from the applied interlaced television signal may be more readily understood by reference to FIG. 1B which discloses the field time relations of the transmitted and displayed television signals. As shown in FIG. 1B the transmitted signal comprises a conventional two-to-one interlaced television signal having sequentially transmitted odd and even fields respectively designated field A and field B. The television signal, as displayed, has both an odd and even field simultaneously scanned during each field period. As is apparent from the diagram, the odd field A1 is scanned at the same time a delay version of the even field B0 is scanned. Subsequently during the next field period the even field B1 is scanned at the same time a delay version of the odd field A1 is scanned.

The simultaneously scanning of odd and even fields is facilitated by the two-pole logic switches 103 and 107. The odd field A1 of the first frame of the transmitted signal is applied, via lead 102, to the two pole logic switch 103. The two-pole logic switch 103 in response to a control signal representative of a binary "1" transmits the odd field A1 to its output lead 113. From thence field A1 is applied, via lead 133, to the first gun of the two gun cathode ray tube 140. Simultaneously with the scanning of field A1, the assumed earlier field B0, which had been delayed by the delay circuit 104 for one field period, is applied, via the two-pole logic switch 107, output lead 117, and lead 137, to the second gun of the cathode ray tube 140.

The subsequent even field B1 of the transmitted television signal is applied, via lead 102, to the two-pole logic switch 103. The unipolar pulse generator 111 in response to the preceding vertical synchronization signal now produces a control signal representative of a binary "0." The two-pole logic switch 103, in response to this control signal, transmits the even field B1 to its output lead 123. From thence field B1 is applied, via lead 137, to the second gun of the two gun cathode ray tube 140. The odd field A1, which has been delayed by the delay circuit 104 for one field period, is restored to its original magnitude by the amplifier 105 and applied to the two-pole logic switch 107. The two-pole logic switch 107, in response to the same control signal transmits the odd field A1 to its output lead 127. From thence the field A1 is applied, via lead 133, to the first gun of the two gun cathode ray tube 140. Hence the fields A1 and B1 are scanned simultaneously as were the fields A1 and B0. The manner in which the subsequent odd and even fields of the television signal are simultaneously displayed may be readily apprehended by reference to FIG. 1B and hence will not be discussed in detail.

It is apparent from the foregoing that each field of the incoming television signal is stored in a delay medium for one field period so it may be applied twice in succession to the same electron gun in the two gun cathode ray tube 140. Hence, by scanning each field of the two-to-one interlaced television signal twice in succession a sequential display eliminating interline flicker is generated from the transmitted interlaced television signal.

Referring now to FIG. 2A, an embodiment of the present invention is shown to enable the conversion of a three-to-one interlaced television signal into a sequentially displayed signal. The picture signal and the vertical synchronizing signal of the transmitted television signal are again separated by apparatus (not shown). The transmitted picture signal is applied to input lead 201 which is connected in parallel to a delay circuit 204 and, via lead 202, to a three-pole logic switch 213. The delay circuit 204 is connected to an amplifier 205 which amplifies the picture signal to compensate for attenuation of the signal in the delay circuit 204. The output of amplifier 205 is connected in parallel to a second delay circuit 206, and, via lead 203, to a second three-pole logic switch 214. The delay circuit 206 is connected to an amplifier 207 which amplifies the picture signal to again compensate for attenuation of the signal in the delay circuit 206. The amplifier 207 is connected to a third three-pole logic switch 215. Each of the delay circuits 204 and 206 delays the picture signal for a time period equal to one field duration of the transmitted television signal. As hereinabove described with reference to FIG. 1, the delay of the amplifiers 205 and 207 is assumed to be negligible.

The signal switching of the three-pole logic switches 213, 214, and 215 is controlled by ternary control signals generated by the bipolar pulse generator 211. The control signals generated by the bipolar pulse generator 211 have three levels representative, respectively, of a +1, a 0, and a −1. The changes in the level of the control signals generated by the bipolar pulse generator 211 are responsive to the vertical synchronization signals applied to it, via lead 210. Each succeeding vertical synchronization signal causes the control signal output to change to a different signal level in a selected sequence. In the illustrative embodiment this sequence is +1, 0, −1. The design of a suitable bipolar pulse generator should be readily apparent to those skilled in the art.

The three-pole logic switches 213, 214, and 215 each have three output leads. An incident picture signal may be directed to any one of the three output leads. The respective one of these leads, to which the incident picture signal is directed, is selected in response to the control signals of the bipolar pulse generator 211, applied to the logic switches 213, 214, and 215 via lead 216. For example, in response to a +1 control signal, picture signals incident to the logic switches 213, 214, and 215 will be respectively transmitted to the output leads 223, 224, and 235. In response to a 0 control signal the picture signals are respectively transmitted to the output leads 233, 234, and 225. It follows that a −1 control signal will direct the picture signals to the output leads 243, 244, and 245. Each of the three output leads of each of the three-pole logic switches 213, 214, and 215 is individually connected, via leads 251, 252, and 253, to one of three electron guns in the three gun cathode ray tube 260. Each electron gun is assigned to scan one of the three fields. The design of suitable three-pole logic switches to accomplish the aforementioned signal switching should also be readily apparent to those skilled in the art and thus need not be disclosed in detail.

The operation of the sequential display apparatus shown in FIG. 2A may be more readily understood by referring to the diagrammatic illustration, coupled with an explanation thereof, of the timing of the respective transmitted and displayed fields of the television signal as shown in FIG. 2B. Only the scanning of fields of the first frame will be explained; however, the simultaneous scanning of fields of adjacent frames will be readily apparent thereafter. The first field A1 of the first frame is applied, via lead 201, to the delay circuit 204 and, via lead 202, to the three-pole logic switch 213. The bipolar pulse generator 211, during the application of the first field A1 to the lead 201, generates a control signal representative of a+1. The three-pole logic switch 213, in response to this control signal applies the field A1 to its output lead 223. The field A1 on the output lead 223 is applied, via lead 251, to the first gun of the three gun cathode ray tube 260.

The field A1 is delayed for one field period by the delay circuit 204. The field A1 is thence applied, via the amplifier 205 and lead 203, to the three-pole logic switch 214 simultaneously with the application of the field B1, via lead 202, to the three-pole logic switch 213. The bipolar pulse generator 211, in response to the preceding vertical synchronization signal, is now producing a control signal representative of a 0. The three-pole logic switch 213 in response to the 0 control signal applies the field B1 to its output lead 233 and from thence, via lead 252, to the second gun of the three gun cathode ray tube 260. The three-pole logic switch 214 applies the field A1 to its output lead 234, and from thence, via lead 251, to the first gun of the three gun cathode ray tube 260.

Prior to the application of field C1 to the input lead 201 the vertical synchronization signal switches the bipolar pulse generator into its third state, wherein it produces a control signal representative of a −1. The three-pole logic switch 213 in response to the −1 control signal applies the field C1 to its output lead 243 and from thence it is transmitted, via lead 253, to the third gun of the three gun cathode ray tube 260. The field B1, which has been delayed for one field period by the delay circuit 204, is applied, via lead 203, to the three-pole logic switch 214. The three-pole logic switch 214 in response to the −1 control signal directs the application of field B1 to its output lead 244 and from thence, via lead 252, to the second gun of the three gun cathode ray tube 260.

Field A1, which has been delayed for two consecutive field periods by the delay circuits 204 and 206, is applied, via the amplifier 207, to the three-pole logic switch 215. The three-pole logic switch 215 in response to the −1 control signal applies the field A1 to its output lead 245 and from thence it is transmitted, via lead 251, to the first gun of the three gun cathode ray tube 260. Hence it is apparent that field C1 and the delayed fields A1 and B1 are all simultaneously scanned in the same field period. The above described apparatus will display the fields of succeeding frames in the same described sequence.

It will be readily apparent to those skilled in the art that each field of the television signal is stored in a delay medium for two consecutive field periods and scanned by its assigned electron gun three consecutive times. The number of lines scanned during each field period is thereby equal to the total number of lines scanned in each frame of the transmitted television signal and hence a sequential display is generated from the three-to-one interlaced television signal.

It will be readily apparent to those skilled in the art that the principles of the present invention may be readily extended to a four-to-one, or higher, interlaced television signal by providing for example a four gun cathode ray tube with appropriate logic switches and a three field delay medium. Many and varied other arrangements may also be utiilzed to apply the principles, herein described, without departing from the spirit and scope of applicant's invention.

What is claimed is:

1. A television signal receiver system for producing a sequential picture display from a received interlaced television signal comprising a multigun cathode ray tube including a plurality of electron guns, each of said electron guns being permanently assigned to project one of said fields, a signal delay medium having a total delay duration equal to the frame period less one field period of said television signal, said delay medium including a plurality of tap-off points equal to the number of fields in said television signal, said plurality of tap-off points spaced a delay duration equal to one field period apart, means to apply said television signal to the input terminal of said delay medium, and a plurality of switching means, each of said switching means connected to one of said plurality of tap-off points and having a plurality of transmission paths equaling the number of said fields, each of said transmission paths of each switching means being coupled to a different one of said electron guns, a control signal generator for generating a predetermined sequence of control signals in response to the synchronizing signals of said television signal, means to couple said control signals to said plurality of switching means whereby each of said switching means in response to said control signal enables transmission in the particular one of its included transmssion paths to couple the field at each of said tap-off points to the said electron gun to which it is assigned.

2. Apparatus as claimed in claim 1 wherein said delay medium has a delay time equal to one field period and tap-off points at its entry and terminus whereby each field is displayed twice in succession by applying each field as it appears at each tap-off point through said switching means to its respective assigned electron gun.

3. Apparatus as claimed in claim 1 wherein said delay medium has a delay time equal to two field periods and tap-off points at its entry, center point and terminus whereby each field is displayed three times in succession by applying each field as it appears at each tap-off point through said switching means to its respective assigned electron gun.

References Cited

UNITED STATES PATENTS

| | | | |
|---|---|---|---|
| 2,273,172 | 2/1942 | Beers. | |
| 3,136,847 | 6/1964 | Brown | 178—6.8 |
| 3,200,195 | 8/1965 | Davies et al. | 178—6.8 |

ROBERT L. GRIFFIN, Primary Examiner

ALFRED H. EDDLEMAN, Assistant Examiner

U.S. Cl. X.R.

178—6.8